United States Patent [19]

Witenhafer

[11] 4,142,033
[45] Feb. 27, 1979

[54] INVERSION POLYMERIZATION PROCESS FOR PRODUCING VINYL RESINS

[75] Inventor: Donald E. Witenhafer, North Olmsted, Ohio

[73] Assignee: The B. F. Goodrich Company, Akron, Ohio

[21] Appl. No.: 905,692

[22] Filed: May 15, 1978

[51] Int. Cl.$^2$ ............................................. C08F 14/06
[52] U.S. Cl. ..................... 526/62; 526/344; 526/344.2; 526/345
[58] Field of Search ...................... 526/62, 344, 344.1, 526/344.2, 345

[56] References Cited

U.S. PATENT DOCUMENTS

| | | | |
|---|---|---|---|
| 3,515,709 | 6/1970 | Nelson et al. | 526/62 |
| 3,669,946 | 6/1972 | Koyanagi et al. | 526/344.2 |
| 3,706,722 | 12/1972 | Nelson et al. | 260/85.5 ZA |
| 4,068,059 | 1/1978 | Witenhafer | 526/62 |

Primary Examiner—Alan Holler
Attorney, Agent, or Firm—Roy P. Wymbs

[57] ABSTRACT

This invention relates to a process of producing vinyl polymers by an inversion polymerization technique in the presence of a two layer coating on the internal surfaces of the polymerization reactor. By inversion polymerization is meant conducting the initial stage of the polymerization reaction wherein the monomer or monomers being polymerized constitute the continuous phase and in the latter stage of polymerization, water constitutes the continuous phase. The coatings comprise an undercoating of an alkali soluble dye dissolved in an aqueous alkali metal hydroxide solution or an ammonium hydroxide solution. The top coating is comprised of a water soluble suspending agent, such as an alkyl or alkylhydroxy alkyl cellulose ether. When polymerizing olefinic monomers, such as vinyl halides, vinylidene halides, and vinylidene monomers having at least one terminal $CH_2=C<$ grouping and mixtures thereof, in the presence of said coatings, polymer buildup on the inner surfaces of the reaction vessel is substantially eliminated. More importantly, multiple charges or batches of polymer can be made in said internally coated reaction vessel without opening the same between charges, thus preventing the escape of unreacted monomer to the atmosphere.

15 Claims, No Drawings

INVERSION POLYMERIZATION PROCESS FOR PRODUCING VINYL RESINS

CROSS-REFERENCE TO RELATED APPLICATIONS

A related application for U.S. Patent is Ser. No. 830,309, filed Sept. 2, 1977 in the names of Donald E. Witenhafer and David T. Popovich, now U.S. Pat. No. 4,117,215 issued Sept. 26, 1978.

BACKGROUND OF THE INVENTION

In the prior art there is described an inversion polymerization process in this connection see particularly British Pat. No. 748,727. In the British patent the process described comprises forming an initial conversion of monomer to polymer of up to 20% by mass polymerization of monomer in the presence of a suitable catalyst. In this first portion of the polymerization, the monomer is the continuous phase. Thereafter, sufficient water is added to the polymerization system to cause a phase inversion wherein the water becomes the continuous phase forming a dispersion of the unpolymerized monomer in the water. This dispersion is then polymerized to convert essentially all of the remaining monomer to solid polymer. However, the disadvantage of such process is that polymer buildup on the walls of the reactor is excessive and requires cleaning after each batch or run is made.

In U.S. Pat. No. 3,706,722 there is described an inversion polymerization process for producing polymers having improved uniformity and porosity, size and structure. This the patentees accomplished by incorporating a nonionic, monomer-soluble surface active agent in the initial continuous monomer phase. While producing a more porous polymer, the polymer buildup is still a problem and detracts from the use of said process on a commercial basis. This is particularly true when producing polymers and copolymers of vinylchloride where the buildup problem and health hazards are most accute.

Therefore, there is a great need to produce polymers having uniform porosity, size and structure by the inversion polymerization procedure which procedure would substantially eliminate polymer buildup.

SUMMARY OF THE INVENTION

I have learned that if the inversion polymerization process is run in a reactor having the proper coating on the inner surfaces thereof, polymer buildup on said surfaces is substantially eliminated. Further, the uniform porosity, size and structure of the polymer particles is not affected by the presence of such coating. In accordance with the present invention, the inner surfaces of the reactor are coated with a prime coating of an alkali soluble dye and then a top coating is applied over the prime coating which is comprised of a water-soluble suspending agent, such as an alkyl or alkyl hydroxyalkyl cellulose ether. The top coating is dissolved off the surfaces, and any polymer buildup along with it, when in the second stage of the polymerization reaction water is the continuous phase. The prime coating comprises the alkali soluble dye dissolved in an aqueous alkali metal or ammonium hydroxide solution and the top coating is an aqueous solution of the suspending agent.

DETAILED DESCRIPTION

In preparing the polymers of the instant invention the first step comprises forming an initial continuous phase of monomer or monomers, which phase contains essentially all of the monomer or monomers to be polymerized. The monomer phase is then polymerized to a conversion of monomer(s) to polymer of between about 1 and about 20 percent and preferably between about 5 and 12 percent. In this first step or stage the monomers are polymerized in mass. However, a water-in-monomer dispersion may be employed, the monomers still being the continuous phase. When using the water-in-monomer dispersion about 0.1% by weight, based on the weight of the water, of a water-soluble suspending agent is employed and the monomer is uniformly mixed with at least about 0.01% by weight and preferably between about 0.1% and about 1.0% by weight, based on the weight of the monomer, of a monomer-soluble dispersing agent, and between about 0.1% and about 0.5% by weight of a monomer-soluble polymerization initiator.

In the second stage of the inversion polymerization process, the water containing a water-soluble suspending or dispersing agent is added to the water-in-monomer dispersion or initially mass polymerized monomer. The water solution can be added in any suitable manner. The water solution is added in such an amount so as to give the desired concentration of monomer for final polymerization purposes. In this final polymerization stage, water constitutes the continuous phase.

The monomer-soluble dispersing agents for use in the inversion polymerization process are the nonionic monomer-soluble esters of fatty acids with glycerol, sorbitol and their polyoxyethylene derivatives and the nonionic, monomer-soluble multi-valent metal salts of fatty acids, alkyl sulfonates and sulfates. As examples of such dispersing agents there may be named sorbitan monostearate, sorbitan tristearate, glycerol monooleate, glycerol monostearate, glycerol monopalmitate, sorbitan monooleate, and the like, calcium dilauryl sulfate, zinc dilauryl sulfate, barium distearyl sulfonate, aluminum trilauryl sulfate, and the like.

As examples of the water-soluble suspending agents are the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of the cellulose ethers may be used but it is preferred to use the lower viscosity grades, such as about 10 cps to about 400 cps. By viscosity grade is meant the viscosity of a 2% aqueous solution of the cellulose ether measured at 20° C. The low viscosity grades of methyl cellulose and hydroxy-propyl methyl cellulose are preferred cellulose ethers since they are easily dissolved in water.

The monomers employed in the inversion polymerization process are the essentially water-insoluble, ethylenically unsaturated liquid monomers which form polymers which are insoluble in their monomers. Examples of such monomers are the vinyl halides, such as vinyl chloride, vinyl bromide, the vinylidene halides, such as vinylidene chloride, the vinyl alkanoates, such as vinyl acetate, acrylonitrile, and mixtures of said monomers. Other ethylenically unsaturated monomers may be used in admixture with the above monomers so long as such admixtures remain essentially insoluble in water and form polymers which are insoluble in their monomers. The most useful monomer in the inversion polymerization process is vinyl chloride and the invention will be described hereinafter in connection therewith, it being understood that this is not intended in a limitative sense.

In the polymerization of the monomers a monomer-soluble free radical producing catalyst or initiator is employed. Examples of such catalysts are di-secondary butyl peroxydicarbonate, isopropyl peroxypercarbonate, lauroyl peroxide, and the like. Any of the known monomer soluble catalysts may be used which those skilled in the art are familiar with. The polymerization reaction is conducted at a temperature in the range of about 30° C. to about 80° C.

In the practice of the present invention, the inversion process is conducted in a reactor which has been previously coated with a water-insoluble prime coating and with a water-soluble top coating. With respect to the prime coating, an aqueous alkali metal hydroxide or an ammonium hydroxide solution of the alkali soluble dye is sprayed or brushed on the internal surfaces of the reactor and the coating is then rinsed with water. Preferably, demineralized water is used in the rinsing step. Drying of the coating is not necessary prior to the application of the top coating.

Among the dyes suitable in making the prime coating of the present invention are those which contain in their chemical structure one or more of the following radicals: —OH, —COOH, —SO$_3$H, and —SO$_3$Na which radicals may be the same or different on any one dye structure. These groups or radicals are usually attached to an aromatic nucleus. While other groups or radicals are present in most of the dyes, the above-named radicals are necessary for alkali solubility, that is, in an aqueous alkali metal hydroxide solution or in an aqueous ammonium hydroxide solution. The classes of dyes which contain one or more of said radicals are the azo dyes, such as monoazo and polyazo dyes; metalcontaining azo dyes; mordant dyes; pyrazolones; stilbene dyes; azoic dyes; phenols; naphthols; anthraquinone dyes; diphenylmethane and triphenylmethane dyes; thiazoles, nitro dyes; nitroso dyes; xanthenes; benzoquionones and napthoquinones; and solubilized vat dyes, such as indigoids and anthraquinoids. In addition to these dyes, the ionic dyes are also useful in the practice of the present invention. By ionic dyes is meant the acridines, azines, oxazines and the thiazines. The ionic dyes exist as salts in the dry state and all have a heterocyclic ring system in their structure which is positively charged. As specific examples of the above-named dyes having one or more of the indicated radicals in their chemical structure, there may be named 4-(nitrophenylazo)Resorcinol, Alizarin, Alizarin Yellow R, Alizarin Red S, Orange G, Phenolphthalein, Naphthol Yellow S, Congo Red, Eriochrome Black T, Tartrazine, Chrome Violet, Auramine O, Malachite Green, Naphthazarin, Alizarin Irisol R, and Indigosol O. As specified examples of the ionic dyes, there may be named Celestine Blue, Acridine Orange NO, Saframine T, Meldola's Blue, and Methylene Blue.

The top coating, which is an aqueous solution of a water-soluble suspending agent, is applied over the prime coating by spraying and the excess drained from the reactor. It is not necessary to dry the top coating and the reactor can be charged immediately. Whether or not the top coating is dried, care must be taken to not prematurely remove the coating by getting water directly in contact with the wall. As examples of water-soluble suspending agents, useful as a top coating in the present invention, there may be named methyl cellulose, hydroxypropyl methyl cellulose, polyvinyl alcohol, polyethylene oxide, polyvinyl pyrrolidone, and the like.

In the first stage of the polymerization when the monomer constitutes a continuous phase, the top coating is insoluble in said phase and substantially prevents buildup of polymer on the internal surfaces of the reactor. In the second stage of the reaction when the water constitutes the continuous phase, the top coating is dissolved off the surfaces into the reaction medium leaving the prime coating intact. If any polymer buildup has occurred during the first stage, it is removed into the reaction medium when the top coating is dissolved. Surprisingly, I have found that what little polymer buildup occurs on the top coating during the first stage does not affect finished polymer quality even though removed into the reaction medium. Any large "sandy" buildup polymer particles would, in any event, be separated when the polymer is screened after passing through the dryer.

In the top coating the suspending agent is employed in the concentration in the range of about 0.05% to about 10% by weight. Preferably, a concentration range of 0.5% to 5% by weight is used. The concentration will depend in great part upon the molecular weight of the suspending agent being employed. For example, a 2 to 4% by weight solution of hydroxypropylmethyl cellulose in water is very satisfactory.

The prime coating and top coating solutions of the present invention are made by conventional methods, using heat and agitation where necessary. When using an alkali soluble dye in the prime coating, it is dissolved in the aqueous alkali metal hydroxide or ammonium hydroxide solution to an extent such that the solids content of the coating solution does not prevent it being sprayed on the inner surfaces of the reactor through appropriate spray nozzles.

Usually a coating solution having a solids content of alkali soluble dye in the range of about 0.1% to about 20% by weight is satisfactory. However, since the solids content depends upon the molecular weight of the particular alkali soluble dye being used, it could, in certain instances, be greater than 20% or less than 0.1% by weight.

In order to further illustrate the present invention, the following specific examples are given. It is to be understood, however, that this is merely intended in an illustrative and not in a limitative sense. In the Examples, all parts and percents are by weight, unless otherwise indicated.

EXAMPLE I

In this Example the inner surfaces of the reactor were coated with a prime coating of Orange G. The Orange G was dissolved in 0.25 normal sodium hydroxide to give a 1.0% coating solution. The internal surfaces of the reactor were coated with said solution by spraying and then rinsed with demineralized water. Then the surfaces were coated with the top coating of a 4% aqueous solution of hydroxypropyl methyl cellulose and allowed to drain. The excess coating solution was then removed from the reactor. Thereafter 0.68 part of Sorbitan monostearate, based on 100 parts of monomer, was charged to the reactor. The reactor was then evacuated to 27" of mercury. Then 0.02 part disecondary butyl peroxydicarbonate per 100 monomer as a 20% solution in hexane was charged to the reactor followed by 100 parts of vinyl chloride. The reactor was heated to 52° C. at about 120 psig pressure. Then 40 parts of demineralized water containing 0.04 part hydroxypropyl methyl cellulose was added over a period of 15 minutes with agitation in the manner to avoid direct contact with the wall. The first stage polymerization was continued with agitation for a period of one hour or to a conversion of monomer to polymer of about 8%.

After said first stage, 160 parts of demineralized water containing 0.16 part of hydroxypropyl methyl cellulose was metered into the reactor over a period of one hour. Thereafter, the polymerization reaction was continued in the second stage with water being the continuous phase until the pressure in the reactor reached 90 psig. This resulted in a total conversion of about 85%. The polymer was removed and dried in the usual manner. Upon removal of the polymer or polymer slurry, the inner surfaces of the reactor were examined and found to be substantially free of polymer buildup. The polymer so produced had large and uniform particle size and had high porosity as evidenced by its ability to readily absorb plasticizer.

EXAMPLE II

In this Example the inner surfaces of the reactor were coated with a prime coating of Alizarin. The Alizarin was dissolved in 0.25 normal NaOH to give a 1.0% coating solution and the surfaces were then coated with said solution in the same manner as defined in Example I. The surfaces were then coated with a top coating as described in Example I. Polyvinyl chloride (PVC) was then made in the reactor using the same recipe and the process defined in Example I. Upon removal of the polymer or polymer slurry the inner surfaces of the reactor were examined and found to be substantially free of polymer buildup.

EXAMPLE III

In this Example the same procedure was followed throughout as in Example I with the exception that Alizarin Red S was the alkali soluble dye employed. The reactor was coated in the same manner as in Example I and the same polymerization recipe and process was employed. Here again upon examination of the reactor and the removal of the polymer it was found that buildup had been substantially eliminated.

As can be seen from the Examples the coating of the internal surfaces of the polymerization reactor with the prime coating and a top coating, in accordance with the present invention, for use with the inversion polymerization process substantially reduces polymer buildup on such surfaces. This results in increased production over unit period of time. The polymer buildup, if any, in the first stage or the monomer continuous phase is removed into the reaction medium by dissolution of the top coating and in those instances where a little polymer buildup does accumulate on the interior surfaces, it is not of the hard, rough difficult-to-remove type and is easily removed without employing the difficult and tedious scraping methods that have heretofor been necessary in the art. Further, the polymers produced in accordance with the present invention are of a highly uniform size, shape and porosity. These polymers also have improved bulk density, low gel content and good flow characteristics. In addition, the polymer particles are capable of enhanced, uniform, plasticizer absorption. Numerous other advantages of the present invention will be apparent to those skilled in the art.

While the present invention has been described in terms of its specific embodiments, certain modifications and equivalents will be apparent to those skilled in the art and are intended to be included within the scope of the invention, which is to be limited only by the scope of the appended claims.

I claim:

1. In a process of inversion polymerizing substantially water-insoluble polymerizable ethylenically unsaturated monomer(s) in a reaction vessel by first forming a continuous monomer(s) phase in the presence of a monomer-soluble surface active agent and a monomer-soluble catalyst, polymerizing said monomer phase at a temperature in the range of about 30° C. to about 80° C. with agitation until a conversion to polymer less than about 20% occurs, adding sufficient water to the monomer-polymer mixture with agitation and in the presence of at least about 0.1% by weight of a water-soluble suspending agent for said monomer(s) to form a dispersion wherein water is the continuous phase, then polymerizing the dispersion at a temperature in the range of about 30° C. to about 80° C. to convert the remaining monomer(s) to polymer, the improvement which comprises (1) applying to the internal surfaces of said reaction vessel a prime coating of a dye dissolved in an aqueous alkali metal hydroxide or ammonium hydroxide solution, said dye being selected from the group consisting of acridines, azines, oxazines, thiazines, and alkali soluble dyes having in their chemical structure one or more radicals selected from the group consisting of —OH, —COOH, —SO$_3$H and —SO$_3$Na, and wherein said radicals may be the same or different on any one dye structure, (2) applying to said prime coating a top coating of a water-soluble suspending agent, (3) polymerizing the continuous monomer phase in constant contact with said top coating, and (4) polymerizing said continuous water phase in constant contact with said prime coating after dissolving said top coating in the continuous water phase, whereby polymer buildup on said internal surfaces is substantially eliminated.

2. A process as defined in claim 1 wherein the dye of the prime coating is Orange G.

3. A process as defined in claim 1 wherein the dye of the prime coating is Alizarin.

4. A process as defined in claim 1 wherein the dye of the prime coating is Alizarin Red S.

5. A process as defined in claim 1 wherein the top coating is an alkyl hydroxyalkyl cellulose ether.

6. A process as defined in claim 1 wherein the continuous monomer phase is a water-in-monomer dispersion.

7. A process as defined in claim 1 wherein the monomer is vinyl chloride.

8. A process as defined in claim 1 wherein the monomer-soluble surface active agent is selected from the group consisting of nonionic esters of fatty acids with glycerol, sorbitol and their polyoxyethylene derivatives and nonionic multi-valent metal salts of fatty acids, alkyl sulfonates and sulfates.

9. A process as defined in claim 5 wherein the top coating is hydroxypropyl methyl cellulose.

10. A process as defined in claim 2 wherein the top coating is hydroxypropyl methyl cellulose.

11. A process as defined in claim 3 wherein the top coating is hydroxypropyl methyl cellulose.

12. A process as defined in claim 4 wherein the top coating is hydroxypropylmethyl cellulose.

13. A process as defined in claim 8 wherein the surface active agent is sorbitan monostearate.

14. A process as defined in claim 13 wherein the dye of the prime coating is Orange G and the top coating is hydroxypropyl methyl cellulose.

15. A process as defined in claim 14 wherein the monomer is vinyl chloride.

* * * * *